United States Patent
Nomura et al.

(10) Patent No.: US 11,775,234 B2
(45) Date of Patent: Oct. 3, 2023

(54) PRINTING SYSTEM FOR CONTINUOUS PROCESSING FROM PRINTING TO BINDING AND PRINTING METHOD THEREOF

(71) Applicant: SCREEN HOLDINGS CO., LTD., Kyoto (JP)

(72) Inventors: Seiya Nomura, Kyoto (JP); Tetsuya Ishida, Kyoto (JP); Susumu Takahashi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 17/850,255

(22) Filed: Jun. 27, 2022

(65) Prior Publication Data

US 2023/0014534 A1    Jan. 19, 2023

(30) Foreign Application Priority Data

Jul. 19, 2021   (JP) .................................. 2021-118429

(51) Int. Cl.
*G06F 3/12*     (2006.01)
*B41J 11/42*   (2006.01)
(Continued)

(52) U.S. Cl.
CPC ............. *G06F 3/1215* (2013.01); *B41J 11/42* (2013.01); *B41J 11/663* (2013.01); *G06F 3/121* (2013.01);
(Continued)

(58) Field of Classification Search
CPC ...... G06F 3/1215; G06F 3/1208; G06F 3/121; G06F 3/1256; G06F 18/30; G06F 3/1264; G06F 2215/0487; G06F 2215/00814; B41J 11/42; B41J 11/663; G06K 15/027; G06K 15/1817; G06K 15/1836; G06K 15/404; G06K 15/408; G06K 15/1867
See application file for complete search history.

(56) References Cited

U.S. PATENT DOCUMENTS

| 5,548,390 A | 8/1996 | Sugisaki et al. |
| 2008/0187384 A1* | 8/2008 | Yamamoto .............. G06F 3/121 400/74 |

(Continued)

FOREIGN PATENT DOCUMENTS

| DE | 102020122423 A1 * | 5/2021 |
| JP | 07-237336 A | 9/1995 |

OTHER PUBLICATIONS

Attached DE-102020122423-A1 in English (It corresponds to the cited Foreign Patent Document) (Year: 2021).*

*Primary Examiner* — Juan M Guillermety
(74) *Attorney, Agent, or Firm* — McDermott Will & Emery LLP

(57) ABSTRACT

A printing system is provided with a dummy data insertion unit configured to insert dummy data into print data based on waiting time occurring when post-processing is performed by a post-processing device (for example, a collating machine). In a printing unit, a dummy page is printed on the basis of the dummy data. A dummy page removing unit configured to remove a dummy page from printed printing paper so that the dummy page is not supplied to the post-processing device is provided between the printing device and the post-processing device.

15 Claims, 19 Drawing Sheets

(51) Int. Cl.
*G06K 15/02* (2006.01)
*B41J 11/66* (2006.01)
*G06K 15/00* (2006.01)

(52) U.S. Cl.
CPC .......... *G06F 3/1208* (2013.01); *G06F 3/1256* (2013.01); *G06K 15/027* (2013.01); *G06K 15/1817* (2013.01); *G06K 15/1836* (2013.01); *G06K 15/404* (2013.01); *G06K 15/408* (2013.01)

(56) References Cited

U.S. PATENT DOCUMENTS

| | | | |
|---|---|---|---|
| 2012/0113183 A1* | 5/2012 | Ikeda | B41J 2/2146 347/19 |
| 2013/0193641 A1* | 8/2013 | Hasegawa | G03G 15/6552 271/279 |
| 2016/0266854 A1* | 9/2016 | Tonouchi | G06K 15/1817 |

* cited by examiner

Fig.9

| JOB | WAITING TIME (seconds) | INSERTED PAGE LENGTH (m) |
|---|---|---|
| Ja | 2 | 3.33 |
| Jb | 2 | 3.33 |
| Jc | 3 | 5.00 |
| Jd | 3 | 5.00 |
| Je | 3 | 0.00 |

| JOB | PAGE NUMBER | PAGE LENGTH (m) | WAITING TIME (seconds) | DECREASE AMOUNT OF REMAINING BUFFER AMOUNT (m) | RECOVERY AMOUNT OF REMAINING BUFFER AMOUNT (m) | BUFFER POSITION (BUFFER CONSUMPTION AMOUNT) (m) | INSERTED PAGE LENGTH (m) |
|---|---|---|---|---|---|---|---|
| Ja | 1 | 0.61 | 0 | 0.00 | 0.00 | 0.00 | — |
| | 2 | 0.61 | 0 | 0.00 | 0.00 | 0.00 | — |
| | 3 | 0.61 | 0 | 0.00 | 0.00 | 0.00 | — |
| | ⋮ | ⋮ | ⋮ | ⋮ | ⋮ | ⋮ | — |
| | 200 | 0.61 | 0 | 0.00 | 0.00 | 0.00 | — |
| SWITCH | | | 2 | 3.33 | 0.00 | 3.33 | 0.00 |
| Jb | 1 | 0.61 | 0 | 0.00 | 0.02 | 3.32 | — |
| | 2 | 0.61 | 0 | 0.00 | 0.02 | 3.30 | — |
| | ⋮ | ⋮ | ⋮ | ⋮ | ⋮ | ⋮ | — |
| | 200 | 0.61 | 0 | 0.00 | 0.02 | 0.00 | — |
| SWITCH | | | 2 | 3.33 | 0.00 | 3.33 | 0.00 |
| Jc | 1 | 0.61 | 0 | 0.00 | 0.02 | 3.32 | — |
| | 2 | 0.61 | 0 | 0.00 | 0.02 | 3.30 | — |
| | ⋮ | ⋮ | ⋮ | ⋮ | ⋮ | ⋮ | — |
| | 200 | 0.61 | 0 | 0.00 | 0.02 | 0.00 | — |
| SWITCH | | | 2 | 3.33 | 0.00 | 3.33 | 3.33 |
| Jd | 1 | 0.61 | 0 | 0.00 | 0.02 | 3.32 | — |
| | 2 | 0.61 | 0 | 0.00 | 0.02 | 3.30 | — |
| | ⋮ | ⋮ | ⋮ | ⋮ | ⋮ | ⋮ | — |
| | 100 | 0.61 | 0 | 0.00 | 0.02 | 1.50 | — |
| SWITCH | | | 2 | 3.33 | 0.00 | 3.33 | 0.00 |
| Je | 1 | 0.61 | 0 | 0.00 | 0.02 | 3.32 | — |
| | 2 | 0.61 | 0 | 0.00 | 0.02 | 3.30 | — |
| | ⋮ | ⋮ | ⋮ | ⋮ | ⋮ | ⋮ | — |
| | 200 | 0.61 | 0 | 0.00 | 0.02 | 0.00 | — |

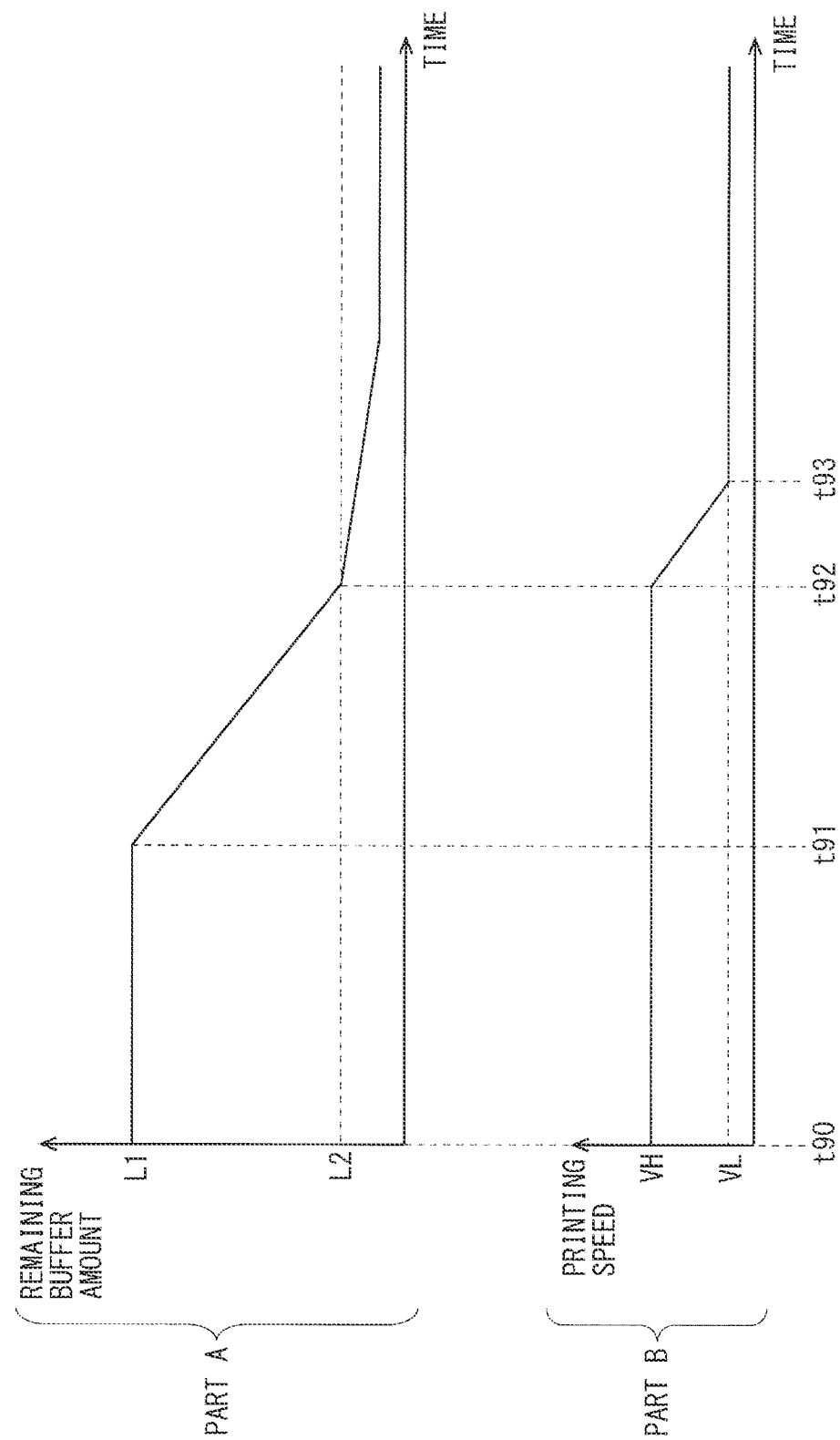

PRINTING SYSTEM FOR CONTINUOUS PROCESSING FROM PRINTING TO BINDING AND PRINTING METHOD THEREOF

CROSS REFERENCE TO RELATED APPLICATION

This application claims the benefit of Japanese Application No. 2021-118429, filed on Jul. 19, 2021, the entire contents of each are hereby incorporated by reference.

BACKGROUND OF THE INVENTION

Field of the Invention

The present invention relates to a printing system and a printing method, and more particularly to a printing system configured to be able to perform processes continually from printing to bookbinding, and a printing method in the printing system.

Description of Related Art

Conventionally, as an apparatus for performing printing and binding of a book or the like, a printing device that performs printing on a base material (print medium) and a post-process machine (post-processing device) that performs processing called "post-process" (hereinafter, also referred to as "post-processing") on the printed base material are known. In recent years, digital printing devices (for example, ink-jet printers) have been increasingly employed as printing devices. In a digital printing device used for bookbinding, long belt-shaped printing paper (continuous paper) called roll paper is typically employed as a base material. As post-process machines, a sheet cutter (cutting machine) that cuts continuous paper after printed by a printing device into sheets of a specified size, a folding machine that creates signatures from printing paper cut into the specified size, a gathering machine that gathers a plurality of signatures, a binding machine that performs binding processing on a group of signatures in a collated state, a three-way cutting machine that performs finish cutting in three directions (head, tail, fore edge) of a book, and the like are known. Note that the post-process machine to be used differs depending on the type of the final product.

By the way, in recent years, high-mix small-lot production has been increasingly popular in printing and binding. When high-mix small-lot production is performed, the frequency at which human work is required is higher as compared to small-variety mass production. When human work is required, the cost increases, and the probability of occurrence of defective products and the like due to work errors also increases. Therefore, in recent years, in-line processes from printing to bookbinding have been advanced. According to the in-line system, processes from printing to bookbinding can be continually and automatically performed. Therefore, even when high-mix small-lot production is performed, it is possible to suppress the occurrence of defective products and the like due to work errors. In addition, the delivery time can be shortened and the cost can be reduced as compared with the related art.

Regarding the step of performing post-process for bookbinding on the basis of the continuous paper after printing, waiting time (delay) may occur when a transition is made from processing for a certain set (one book) to processing for the next set (one book) in the post-process machine. Typically, in an apparatus (for convenience, it is referred to as a "book-block making machine") that makes a book block by collecting printing paper after cutting for each one set out of a post-process machine group (a plurality of post-process machines) provided downstream of the printing device, waiting time occurs when a set to be processed is switched. In a case where the configuration in which the printing device and the post-process machine group are directly connected (in-line configuration) is adopted, printing paper is supplied to the post-process machine in accordance with the printing speed (conveyance speed of printing paper). Therefore, for example, when printing paper after printing for a book with a small number of pages is supplied to the post-process machine, processing in the post-process machine may not catch up with the supply speed of the printing paper. Therefore, in order to absorb the difference in processing speed between the printing device and the post-process machine, as illustrated in FIG. 20, a web buffer 91 for temporarily holding printed printing paper is provided between a printing device 90 and a post-process machine group 92 including a hook-block making machine 93.

Here, regarding the configuration illustrated in FIG. 20, the conveyance speed of the printing paper in the printing device 90 is represented as V1, and the conveyance speed of the printing paper (printed printing paper) in the post-process machine group 92 is represented as V2. Usually, when no waiting time occurs in the book-block making machine 93, V2 is equal to V1. When waiting time occurs in the book-block making machine 93, V2 is smaller than V1. At this time, the printed printing paper is gradually accumulated in the web buffer 91. Thereafter, when the standby state is resolved, a state in which V2 is larger than V1 is maintained until the remaining amount of the web buffer 91 (hereinafter, the remaining amount is referred to as "remaining buffer amount") becomes full (in other words, until the consumption of the web buffer 91 becomes 0). In this manner, the difference in processing speed between the printing device and the post-process machine (such as the book-block making machine 93) is absorbed.

However, when the difference in processing speed between the printing device 90 and the post-process machine cannot be sufficiently absorbed (for example, when the remaining buffer amount becomes equal to or less than a predetermined threshold value), an instruction (signal) for requesting deceleration or stop is sent from the web buffer 91 to the printing device 90. In response to such an instruction, the printing device 90 changes the printing speed (the conveyance speed V1 of the printing paper).

FIG. 21 is a diagram for illustration of an example of the operation when the printing speed is decelerated according to the conventional configuration. Part A of FIG. 21 shows a change in the remaining buffer amount, and Part B of FIG. 21 shows a change in the printing speed. At time t90, the remaining buffer amount is L1 (full state), and the printing speed is high speed VH. When waiting time occurs in the post-process machine at time t91, the remaining buffer amount gradually decreases after time t91. At this time, the printing speed is maintained at the high speed VH. When the remaining buffer amount reaches L2 at time t92, an instruction for requesting deceleration is sent from the web buffer 91 to the printing device 90. As a result, the printing speed starts to decrease at time t92, and the printing speed becomes low speed VL at time t93. Thereafter, although not shown in FIG. 21, when the remaining buffer amount sufficiently increases, the printing speed changes from the low speed VL to the high speed VH.

In connection with the present invention, Japanese Laid-Open Patent Publication No. H07-237336 describes a duplex printing system using two printers, and an intermediate buffer device that absorbs a difference in paper feeding speed is provided between the two printers.

In order to realize the operation as illustrated in FIG. 21, the printing device needs to be configured to be able to respond to an instruction (signal) requesting deceleration or stop from the web buffer. In other words, the printing device needs to be compatible with acceleration/deceleration printing, but a model that can realize this function is limited. In addition, even if the acceleration/deceleration can be performed, it is necessary to incorporate a correction circuit and the like for maintaining quality of printing, and therefore the cost becomes high.

Furthermore, in the example shown in FIG. 21, the printing speed (conveyance speed of the printing paper) greatly fluctuates during the operation of the printing device. In this regard, it is not necessarily easy for the printing device to change the printing speed to the instructed speed within the instructed time. Moreover, the large fluctuation in the printing speed may cause problems such as a change in the amount of ink ejected from the head, drying unevenness due to the fact that the control of the drying heater cannot catch up with the change in the printing speed, landing deviation of ink droplets, and resonance of a servo motor for controlling the printing speed. As a result, the print quality is deteriorated.

Note that Japanese Laid-Open Patent Publication No. H07-237336 does not describe at all the occurrence of waiting time in the post-process machine or absorption of the difference in processing speed between the printing device and the post-process machine.

SUMMARY OF THE INVENTION

In view of the above circumstances, an object of the present invention is to realize a printing system capable of, even printing device does not support acceleration/deceleration printing, suppressing deterioration in print quality due to occurrence of waiting time in a post-process machine (post-processing device).

One aspect of the present invention is directed to a printing system including: a printing device having a conveyance unit that conveys a print medium and a printing unit that performs printing, based on print data, on the print medium conveyed by the conveyance unit; and a post-processing device that performs post-processing to a printed print medium to which the printing is performed by the printing unit, the printing system including:
  a dummy data insertion unit configured to insert, based on waiting time occurring when post-processing is performed to the printed print medium by the post-processing device, dummy data into the print data so that a dummy page is printed by the printing unit; and
  a dummy page removing unit configured to remove the dummy page from the printed print medium so that the dummy page is not supplied to the post-processing device, the dummy page removing unit being disposed between the printing device and the post-processing device.

According to such a configuration, the dummy data insertion unit configured to insert the dummy data into the print data based on the waiting time occurring in the post-processing device is provided in the printing system including the printing device and the post-processing device. When the dummy data is inserted into the print data, the printing unit prints the dummy page. Furthermore, the printing system is provided with a dummy page removing unit configured to remove a dummy page, between the printing device and the post-processing device. With the above configuration, in a case in which waiting time occurs in the post-processing device, a dummy page that is unnecessary by nature is printed depending on the length of the waiting time. Therefore, even if waiting time occurs in the post-processing device, there is no need to lower the printing speed. Furthermore, since the dummy page is removed without being supplied to the post-processing device, the difference in processing speed between the printing device and the post-processing device is absorbed. From the above, it is possible to realize a printing system capable of suppressing deterioration in print quality due to the occurrence of waiting time in the post-processing device even if the printing device does not support acceleration/deceleration printing.

Another aspect of the present invention is directed to a printing method in a printing system including: a printing device having a conveyance unit that conveys a print medium and a printing unit that performs printing, based on print data, on the print medium conveyed by the conveyance unit; and a post-processing device that performs post-processing to a printed print medium to which the printing is performed by the printing unit, the printing method including:
  a dummy data insertion step of inserting, based on waiting time occurring when post-processing is performed to the printed print medium by the post-processing device, dummy data into the print data so that a dummy page is printed by the printing unit; and
  a dummy page removing step of removing the dummy page from the printed print medium so that the dummy page is not supplied to the post-processing device.

These and other objects, features, modes, and advantageous effects of the present invention will become more apparent from the following detailed description of the present invention with reference to the accompanying drawings.

BRIEF DESCRIPTION OF THE DRAWINGS

FIG. 9 is a diagram for illustration of the dummy data insertion processing according to the first embodiment.

FIG. 13 is a diagram for illustration of the dummy data insertion processing according to the second embodiment.

FIG. 21 is a diagram for illustration of an example of the operation when the printing speed is decelerated according to the conventional configuration.

DETAILED DESCRIPTION OF PREFERRED EMBODIMENTS

Hereinafter, embodiments of the present invention will be described with reference to the accompanying drawings.

1. First Embodiment

<1.1 Overall Configuration>

Figure 1:
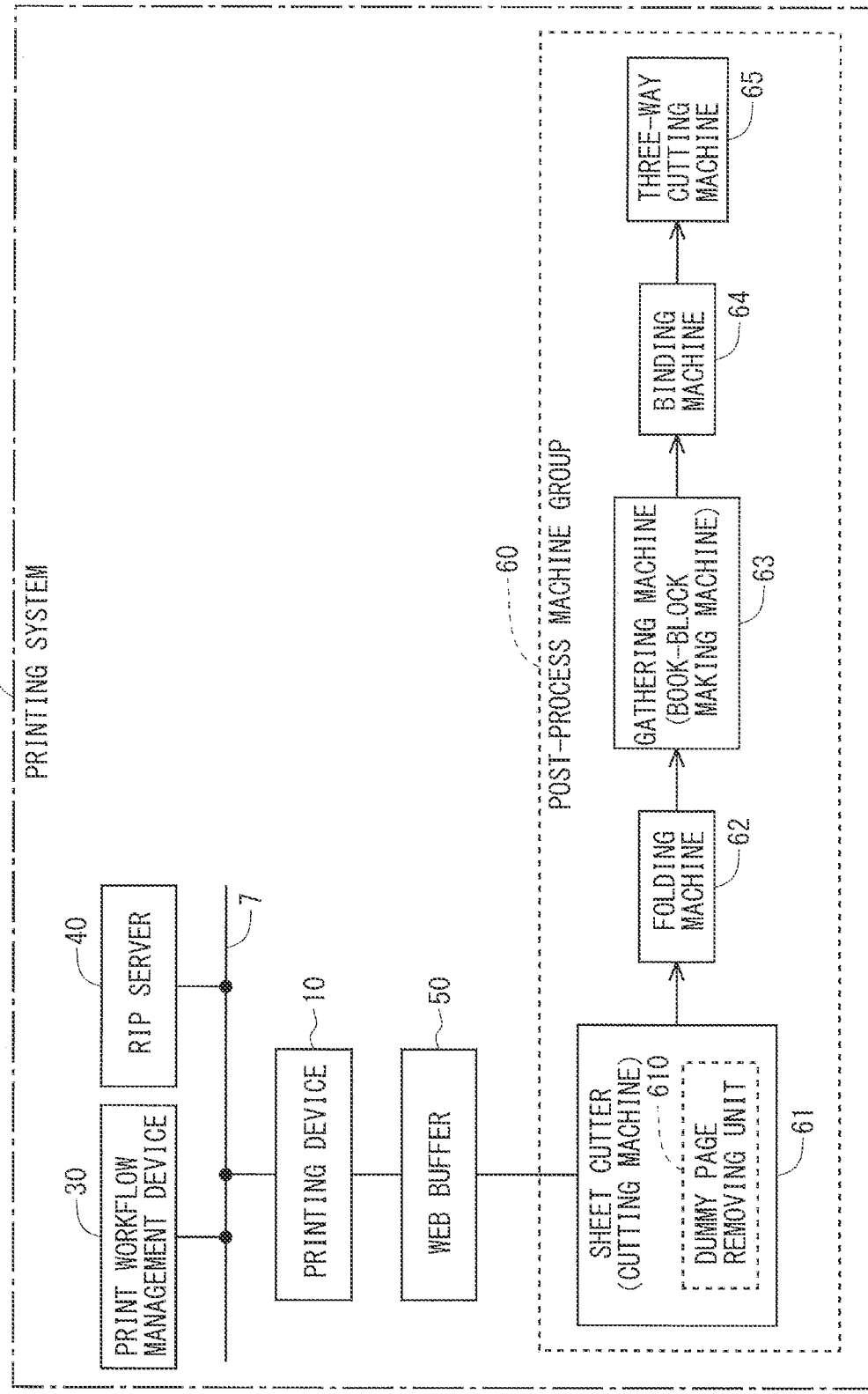
FIG. 1 is a block diagram showing an overall configuration of a printing system according to a first embodiment of the present invention.

FIG. 1 is a block diagram showing an overall configuration of a printing system 1 according to a first embodiment of the present invention. The printing system 1 includes a printing device 10, a print workflow management device 30, a RIP server 40, a web buffer 50, and a post-process machine group 60. The post-process machine group 60 includes a plurality of devices (post-process machines) for performing post-process (post-processing) on printed printing paper (printed print medium).

The printing device 10, the print workflow management device 30, and the RIP server 40 are communicably connected by a network 7 such as a LAN. Submitted data that is data to be printed is sent from a client computer (not illustrated) or the like via the network 7.

The printing device 10 schematically includes a printer main body and a print control device that is a controller of the printer main body. The printing device 10 in the present embodiment is an ink-jet printer. As the printing paper, roll paper which is continuous paper is adopted. By the way, in the printing device 10, printing on the printing paper is performed on the basis of print data into which dummy data is inserted in consideration of waiting time occurring in a post-process machine. Therefore, the printed printing paper includes a dummy page in addition to a page on which a desired image or the like is printed. The insertion of the dummy data into the print data will be described in detail later.

The print workflow management device 30 manages a series of processes for performing printing with the printing system 1 (that is, the print workflow management device 30 manages print workflow). In this regard, a computer such as a personal computer in which application software for managing the print workflow (print workflow management system) is installed functions as the print workflow management device 30.

The RIP server 40 performs RIP processing (rasterization process) on submitted data (data in a vector format) such as a PDF file. Print data generated by the RIP processing is sent from the RIP server 40 to the printing device 10. In the present embodiment, a rasterization processing device is realized by the RIP server 40.

As illustrated in FIG. 1, the web buffer 50 is provided between the printing device 10 and the post-process machine group 60. The printed printing paper is supplied from the printing device 10 to a sheet cutter (cutting machine) 61 included in the post-process machine group 60 via the web buffer 50. The web buffer 50 temporarily holds the printed printing paper as appropriate in order to absorb the difference in processing speed between the printing device 10 and the post-process machine group 60. In the present embodiment, a print medium buffer is realized by the web buffer 50.

The post-process machine group 60 includes the sheet cutter 61, a folding machine 62, a gathering machine 63, a binding machine 64, and a three-way cutting machine 65. The sheet cutter 61 cuts the continuous paper after printed by the printing device 10 into a specified size. The folding machine 62 creates signatures from the printing paper cut to the specified size. The gathering machine 63 collects a plurality of signatures. The binding machine 64 performs binding processing on a signature group in a collated state. The three-way cutting machine 65 performs finish cutting in three directions (head, tail, fore edge) of the book. Note that the configuration of the post-process machine group 60 illustrated here is an example, and is not limited thereto.

The gathering machine 63 out of the post-process machine group 60 functions as a book-block making machine that makes a book block by collecting printing paper after cutting by the sheet cutter 61 for each one set. In the book-block making machine, waiting time occurs from an end point of processing for one to a start point of processing for next one set.

As described above, the printed printing paper includes a dummy page in addition to a page on which a desired image or the like is printed. This dummy page is unnecessary by nature. Therefore, in the present embodiment, a dummy page removing unit 610 that removes the dummy page from the printed printing paper so that the dummy page is not supplied to the collating machine 63 is provided for the sheet cutter 61.

<1.2 Configuration of Printing Device>

Figure 2:
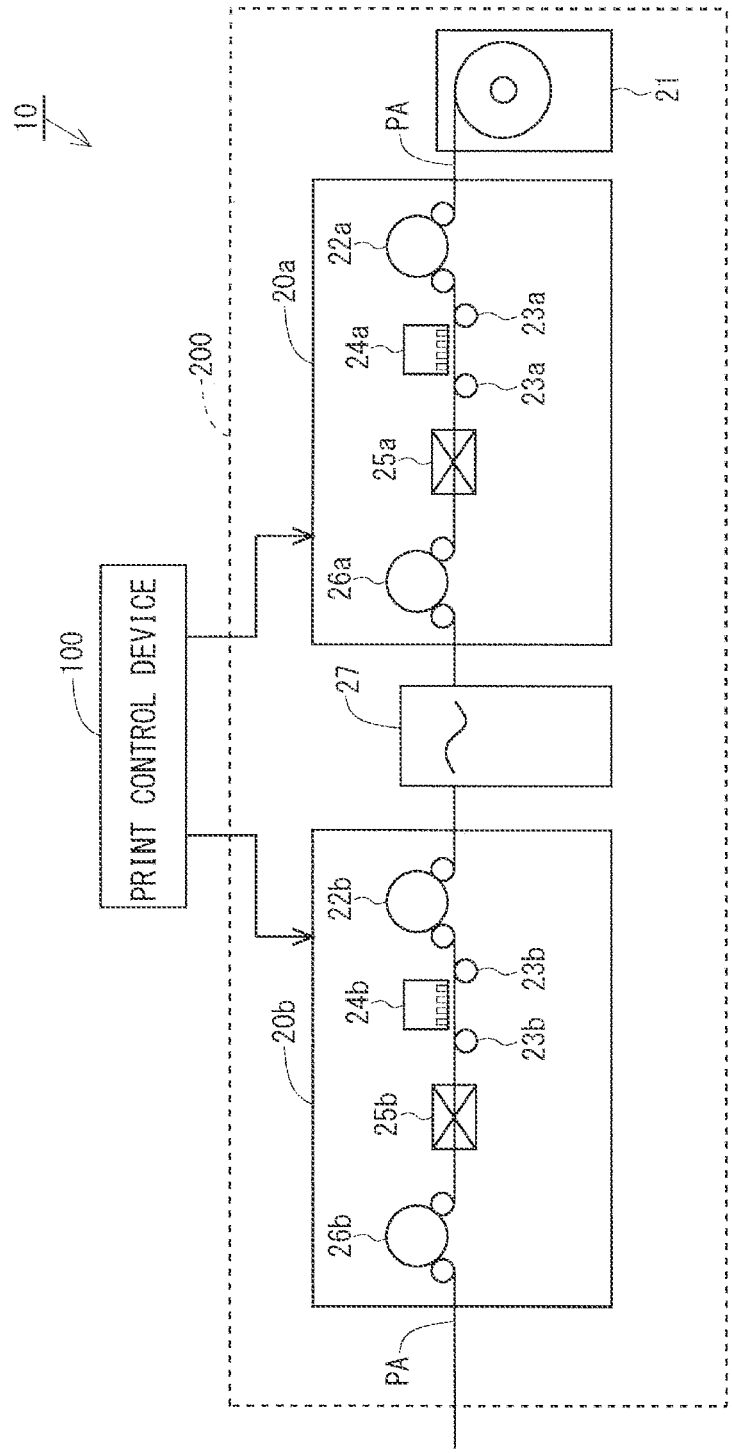
FIG. 2 is a schematic diagram showing a configuration example of a printing device according to the first embodiment.

FIG. 2 is a schematic diagram illustrating a configuration example of the printing device 10. As described above, the printing device 10 includes a printer main body 200 and a print control device 100 that is a controller of the printer main body 200.

The printer main body 200 includes a paper feeding unit 21 that supplies printing paper (here, roll paper) PA, a first printing mechanism 20a that performs printing on the front surface of the printing paper PA, a reversing unit 27 that reverses the front surface and the back surface of the printing paper PA outputted from the first printing mechanism 20a, and a second printing mechanism 20b that performs printing on the back surface of the printing paper PA. The first printing mechanism 20a includes a first driving roller 22a that conveys the printing paper PA to the inside, a plurality of support rollers 23a that convey the printing paper PA inside the first printing mechanism 20a, a printing unit 24a that performs printing by ejecting ink onto the printing paper PA, a drying unit 25a that dries the printing paper PA after printing, and a second driving roller 26a that outputs the printing paper PA from the inside of the first printing mechanism 20a. The printing unit 24a includes, for example, ink jet head rows respectively of C color (cyan), M color (magenta), Y color (yellow), and K color (black) arranged in a row in a conveyance direction of the printing paper PA. Each of the inkjet head rows includes a plurality of inkjet heads (print heads) arranged in a staggered manner. Each of the inkjet heads includes a large number of nozzles that eject ink. Since the configuration of the second printing mechanism 20b is similar to the configuration of the first printing mechanism 20a, the description thereof will be omitted. Note that "a" is added to the end of the reference numeral for components of the first printing mechanism 20a, and "b" is added to the end of the reference numeral for the components of the second printing mechanism 20b.

The print control device 100 controls the operation of the printer main body 200 having the above configuration. When a printout instruction command is given to the print control device 100, the print control device 100 controls the operation of the printer main body 200 so that the printing paper PA is conveyed from the paper feeding unit 21 to the inside. Then, in both of the first printing mechanism 20a and the second printing mechanism 20b, first, printing is performed on the printing paper PA by the printing units 24a and 24b, and then, the printing paper PA is dried by the drying units 25a and 25b.

Here, the configuration of the ink-jet printer that performs color printing has been exemplified, but the present invention can also be applied to a case where an ink-jet printer that performs monochrome printing is adopted. Furthermore, the configuration of the ink-jet printer using aqueous ink has been exemplified here, but the present invention can also be applied to a case where a printing device using UV ink (ultraviolet curing ink) such as an ink-jet printer for label printing is adopted. Moreover, the configuration of the ink-jet printer including the first printing mechanism 20a for printing of the front surface and the second printing mechanism 20b for printing of the back surface has been exemplified here, but the present invention can also be applied to a case where an ink-jet printer not including the second printing mechanism 20b for printing of the back surface is adopted. Furthermore, if the configuration in which the printed printing paper is directly sent from the printing device to the post-process machines is adopted, the present invention can also be applied to a case where a printing device other than the ink-jet printer is used (for example, a laser printer is used). As described above, the type of the printing device is not particularly limited.

<1.3 Hardware Configuration of Print Control Device>

Figure 3:
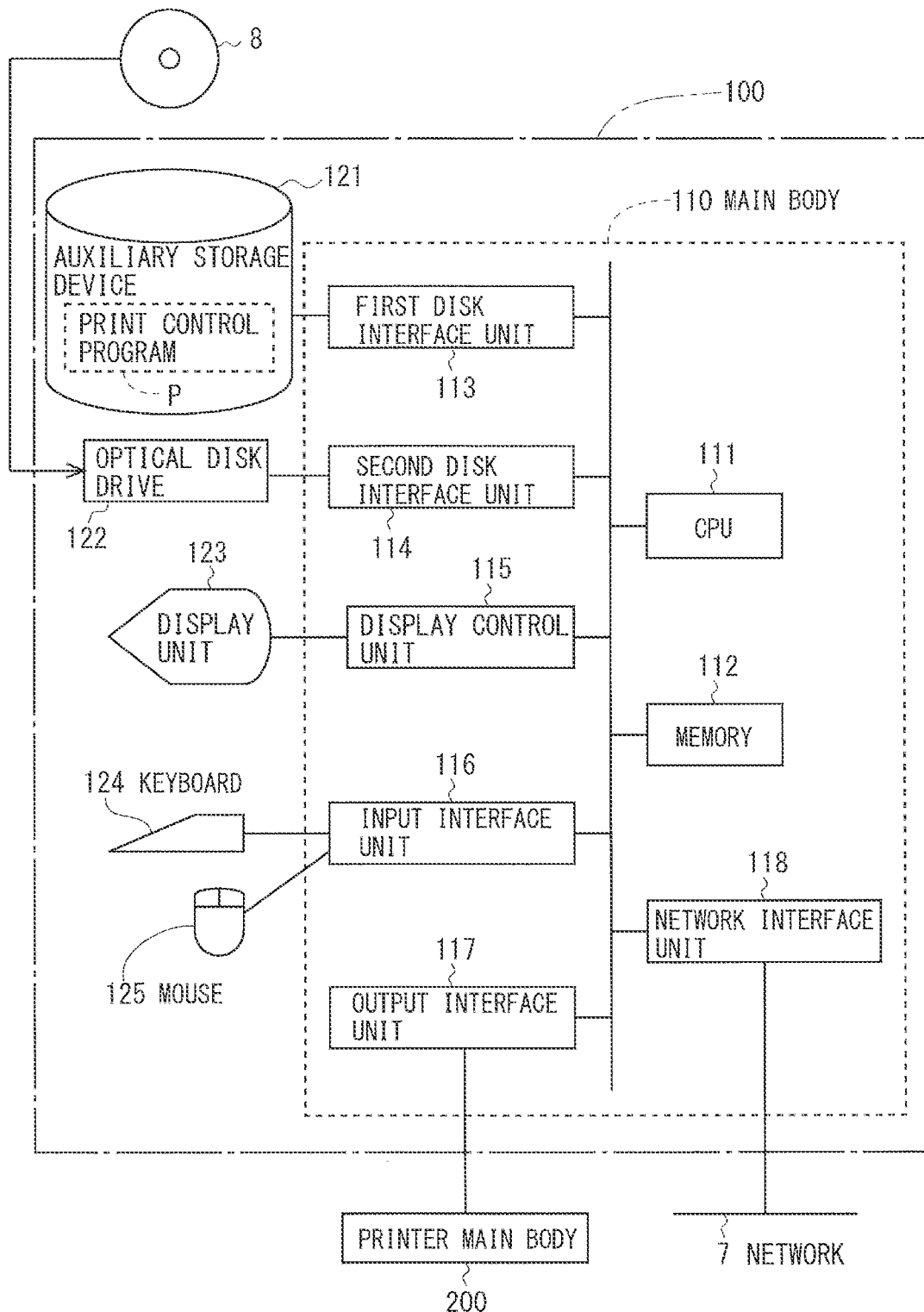
FIG. 3 is a block diagram showing a hardware configuration of a print control device according to the first embodiment.

FIG. 3 is a block diagram illustrating a hardware configuration of the print control device 100. As illustrated in FIG. 3, the print control device 100 includes a main body 110, an auxiliary storage device 121, an optical disk drive 122, a display unit 123, a keyboard 124, a mouse 125, and the like. The main body 110 includes a CPU 111, a memory 112, a first disk interface unit 113, a second disk interface unit 114, a display control unit 115, an input interface unit 116, an output interface unit 117, and a network interface unit 118. The CPU 111, the memory 112, the first disk interface unit 113, the second disk interface unit 114, the display control unit 115, the input interface unit 116, the output interface unit 117, and the network interface unit 116 are connected to each other via a system bus. The auxiliary storage device 121 is connected to the first disk interface unit 113. The optical disk drive 122 is connected to the second disk interface unit 114. The display unit (display device) 123 is connected to the display control unit 115. The keyboard 124 and the mouse 125 are connected to the input interface unit 116. The printer main body 200 is connected to the output interface unit 117 via a communication cable. The network 7 is connected to the network interface unit 116. The auxiliary storage device 121 is a magnetic disk device or the like. An optical disk 8 as a computer-readable recording medium such as a CD-ROM and a DVD-ROM is inserted into the optical disk drive 122. The display unit 123 is a liquid crystal display or the like. The display unit 123 is used to display information desired by an operator. The keyboard 124 and the mouse 125 are used by the operator to input instructions to this print control device 100.

The auxiliary storage device 121 stores a print control program (program for controlling execution of print processing by the printer main body 200) P. The CPU 111 implements various functions of the print control device 100 by reading the print control program P stored in the auxiliary storage device 121 into the memory 112 and executing the print control program P. The memory 112 includes a RAM and a ROM. The memory 112 functions as a work area for the CPU 111 to execute the print control program P stored in the auxiliary storage device 121. The print control program P is provided by being stored in the computer-readable recording medium (non-transitory recording medium). That is, for example, the user purchases the optical disk 8 as a recording medium of the print control program P, inserts the optical disk 8 into the optical disk drive 122, read the print control program P from the optical disk 8, and installs the print control program P in the auxiliary storage device 121. Alternatively, the print control program P transmitted via the network 7 may be received by the network interface unit 118 and installed in the auxiliary storage device 121. Meanwhile, the auxiliary storage device 121 or the memory 112 also functions as a print queue, and the print queue holds print data of jobs in a print execution waiting state and job information that is information regarding the jobs (job for which printing by the printing units 24a and 24b is to be executed).

<1.4 Functional Configuration of Print Control Device>

Figure 4:
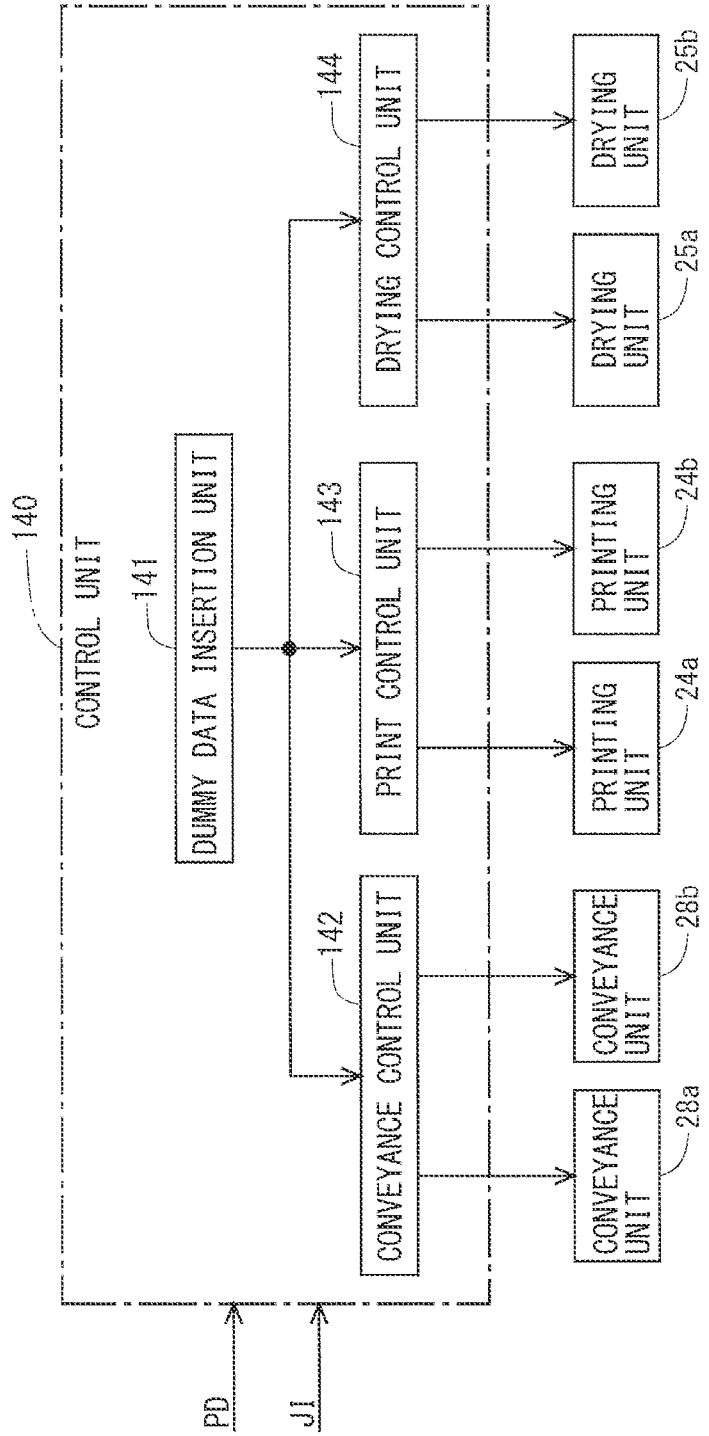
FIG. 4 is a block diagram showing a schematic functional configuration of a control unit according to the first embodiment.

FIG. 4 is a block diagram illustrating a schematic functional configuration of the control unit 140 realized by the print control device 100 executing the print control program P. The control unit 140 schematically includes a dummy data insertion unit 141, a conveyance control unit 142, a print control unit 143, and a drying control unit 144. The control unit 140 reads print data PD and job information JI from the above-described print queue.

The dummy data insertion unit 141 inserts the dummy data into the print data PD so that printing of the dummy page by the printing units 24a and 24b is performed based on waiting time that occurs (more specifically, waiting time that is predicted to occur) when post-processing (specifically, a process of making a book block) is performed to the printed printing paper in the gathering machine 63 (see FIG. 1) included in the post-process machine group 60. At this time, the waiting time occurring in the gathering machine 63 is obtained based on the job information JI.

The conveyance control unit 142 controls the speed (conveyance speed) at which the conveyance units 28a and 28b convey the printing paper PA. In the present embodiment, the paper feeding unit 21, the first driving roller 22a, the plurality of support rollers 23a, and the second driving roller 26a realize the conveyance unit 28a, and the first driving roller 22b, the plurality of support rollers 23b, and the second driving roller 26b realize the conveyance unit 28b (see FIG. 2).

The print control unit 143 controls ejection of ink from nozzles included in each of inkjet heads constituting the printing units 24a and 24b. For example, timing of ink ejection and amount of ink ejection are controlled. In the present embodiment, since the print control unit 143 controls the operations of the printing units 24a and 24b on the basis of the print data into which the dummy data is inserted, the printing paper after printed by the printing units 24a and 24b includes a dummy page.

The drying control unit 144 controls a temperature (drying temperature) when the drying units 25a and 25b dry the printing paper PA.

<1.5 Insertion of Dummy Data and Removal of Dummy Page>

In the present embodiment, in order to absorb the difference in processing speed between the printing device 10 and the post process machine group 60, the dummy data serving as a generation source of a dummy page in a printed matter (printed printing paper) is inserted into the print data PD by the dummy data insertion unit 141. Since the dummy data is inserted into the print data PD depending on the waiting time occurring in the gathering machine 63, when the waiting time occurs in the gathering machine 63, printing of a dummy page having a print length corresponding to the length of the waiting time is performed by the printing units 24a and 24b. Then, the dummy page is not supplied to the gathering machine 63 but is removed by the dummy page removing unit 610 provided for the sheet cutter 61. Since the operation as described above is performed, when the waiting time actually occurs in the gathering machine 63, the difference between the processing speed of the printing device 10 and the processing speed of the post-process machine group 60 is absorbed without reducing the printing speed (the conveyance speed of the printing paper PA in the printing device 10). Note that a dummy data insertion step is realized by processing in which the dummy data insertion unit 141 inserts the dummy data into the print data PD, and a dummy page removing step is realized by processing in which the dummy page removing unit 610 removes the dummy page from the printed printing paper.

Here, a print length (length of the printing paper in the conveyance direction) of the dummy page required to sufficiently absorb the difference in processing speed between the printing device 10 and the post-process machine group 60 will be described. When the waiting time occurring in the gathering machine 63 is represented as Tw and printing speed is represented as V, the distance by which the printing paper is conveyed during the period of a length Tw is represented by "V×Tw". If the print length of the dummy page is shorter than "V×Tw", the web buffer 50 is consumed (the printed printing paper is accumulated in the web buffer 50). In this case, the difference in processing speed between the printing device 10 and the post-process machine group 60 cannot be sufficiently absorbed. Therefore, in the present embodiment, the dummy data is inserted into the print data PD so that the print length of the dummy page becomes "V×Tw".

Figure 5:
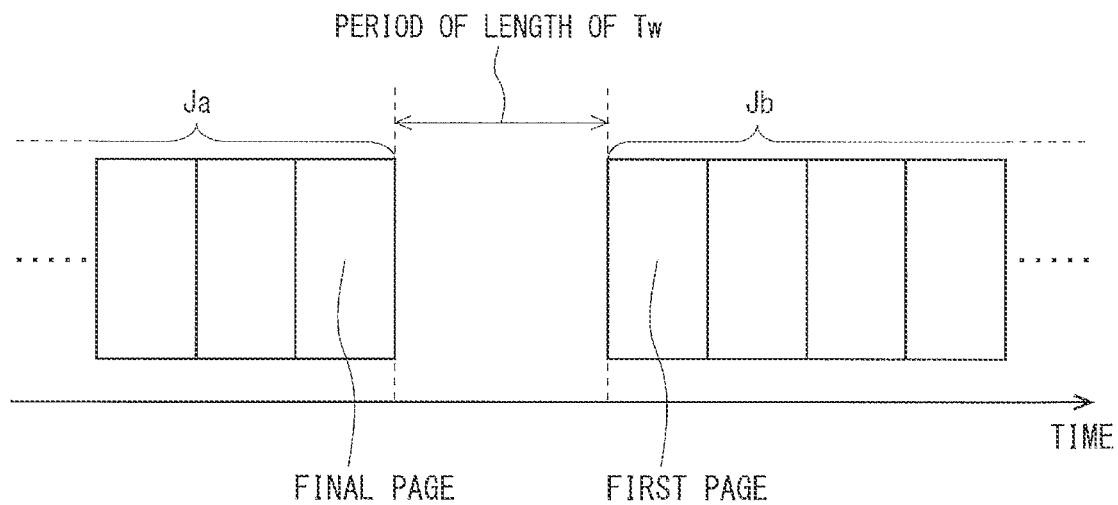
FIG. 5 is a diagram for describing insertion of dummy data according to the first embodiment.

For example, in a case where a dummy page is to be inserted between a final page of a job Ja and a first page of a job Jb, the dummy data is inserted into the print data PD so that printing of the first page of the job Jb starts after a period of the length Tw has elapsed after an end point of printing of the final page of the job Ja as illustrated in FIG. 5. At this time, the print length of the dummy page inserted between the final page of the job Ja and the first page of the job Jb is "V×Tw" described above. In FIG. 5, one page is schematically represented by one rectangle.

Although the print length of the dummy page is "V×Tw" in the above example, the print length of the dummy page may be longer than "V×Tw". That is, the length of the dummy page corresponding to the dummy data inserted into the print data PD by the dummy data insertion unit 141 depending on one waiting time occurring in the gathering machine 63 may be a length equal to or longer than a length corresponding to the product of the printing speed (speed at which printing paper is conveyed by conveyance units 28a and 28b) and the waiting time occurring in the gathering machine 63.

Figure 6:
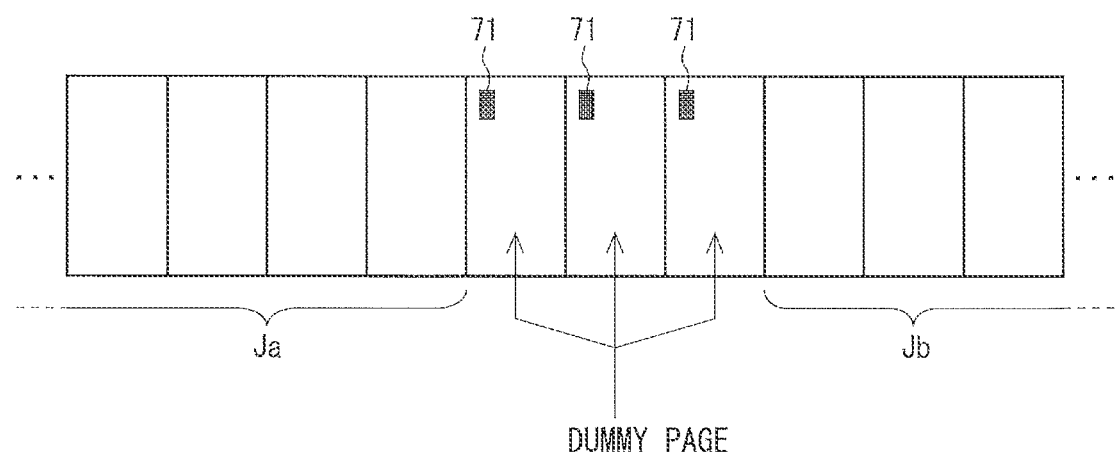
FIG. 6 is a diagram for illustration of printing of a two-dimensional code on a dummy page according to the first embodiment.

In the present embodiment, a two-dimensional code for dummy page identification is printed on the dummy page. For example, when a dummy page is inserted between the final page of the job Ja and the first page of the job Jb, a two-dimensional code 71 is printed at a predetermined position of each of inserted dummy pages as illustrated in FIG. 6. The dummy page removing unit 610 (see FIG. 1) includes a two-dimensional code reader so as to allow determination on whether or not each of pages is a dummy page on the basis of the two-dimensional code 71. When the printed printing paper is supplied to the sheet cutter 61, the dummy page removing unit 610 determines whether or not each page of the printed printing paper is a dummy page based on a reading result of each page of the printed printing paper by the two-dimensional code reader. Then, the page determined to be a dummy page is removed by the dummy page removing unit 610. By identifying whether or not each page is a dummy page on the basis of the two-dimensional code 71 in this manner, omission of removal of the dummy page and erroneous removal of a fundamentally necessary page are suppressed.

In the meantime, generally, in an ink-jet printer, printing of a test pattern for inspecting the presence or absence of a nozzle defect and printing of a flushing pattern for eliminating ink ejection failure may be performed. A page on which such a pattern (test pattern, flushing pattern) is printed can be used as a dummy page. That is, a predetermined pattern used for maintenance of the printing units 24a and 24b may be printed on the dummy page by the printing units 24a and 24b. As a result, printing of the dummy page can contribute to maintenance of the printing units 24a and 24b.

Next, a procedure of a process of inserting dummy data into the print data PD (hereinafter referred to as "dummy data insertion processing") will be described with reference to a flowchart illustrated in FIG. 7. This dummy data insertion processing is performed by the dummy data insertion unit 141 (see FIG. 4). Here, a case where printing based on the print data PD as schematically illustrated in FIG. 8 is performed is focused. Regarding the print data PD illustrated in FIG. 8, the number of pages for the jobs Ja, Jb, Jc, and Je is 200, and the number of pages for the job Jd is 100. In FIG. 8, one page is schematically represented by one rectangle, and a page number is written in the rectangle. It is also assumed that the printing speed is 100 mpm (meters per minute).

After the dummy data insertion processing is started, first, the job information JI regarding a processing target job is acquired from the print queue (step S100). The job information JI includes information such as the number of pages of the job and the page length of each of the pages constituting the job.

Next, it is determined whether or not the processing target job is a final job (step S110). As a result of the determination, when the processing target job is the final job, the dummy data insertion processing ends. On the other hand, when the processing target job is not the final job, the process proceeds to step S120.

In S120, the waiting time occurring in the gathering machine 63 is calculated based on the job information JI acquired in step S100. In step S120, for example, as in a field indicated by an arrow denoted by reference numeral 72 in FIG. 9, the waiting time occurring in the gathering machine 63 after the processing for the processing target job is completed is calculated.

Next, the print length of the dummy page to be inserted (inserted page length) is calculated (step S130). Similarly to the above, when the waiting time is represented by Tw and the printing speed is represented by V, an inserted page length Ld is obtained by the following equation (1). The printing speed of 100 mpm is 1.667 m per second.

$$Ld = V \times Tw \quad (1)$$

For example, since the waiting time occurring after the end of the processing for the job Ja is 2 seconds, the print length of the dummy page inserted immediately after the final page of the job Ja is 3.33 m (see FIG. 9). In addition, for example, since the waiting time occurring after the end of the processing for the job Jc is 3 seconds, the print length of the dummy page inserted immediately after the final page of the job Jc is 5.00 m (see FIG. 9).

After the print length of the dummy page is calculated, the dummy data is inserted into the print data PD so that the dummy page having the length based on the calculation result is inserted (step S140). Thereafter, the processing returns to step S100, and processing related to a next processing target job is performed.

As described above, the insertion of the dummy data into the print data PD is not performed after the actual waiting time occurs, but is performed on the basis of the job information JI. That is, in the present embodiment, the dummy data insertion unit 141 determines whether or not to insert the dummy data into the print data PD when the control of the operations of the printing units 24a and 24b by the control unit 140 (specifically, the print control unit 143) is started on the basis of the data of each of the jobs constituting the print data PD.

Figure 10:
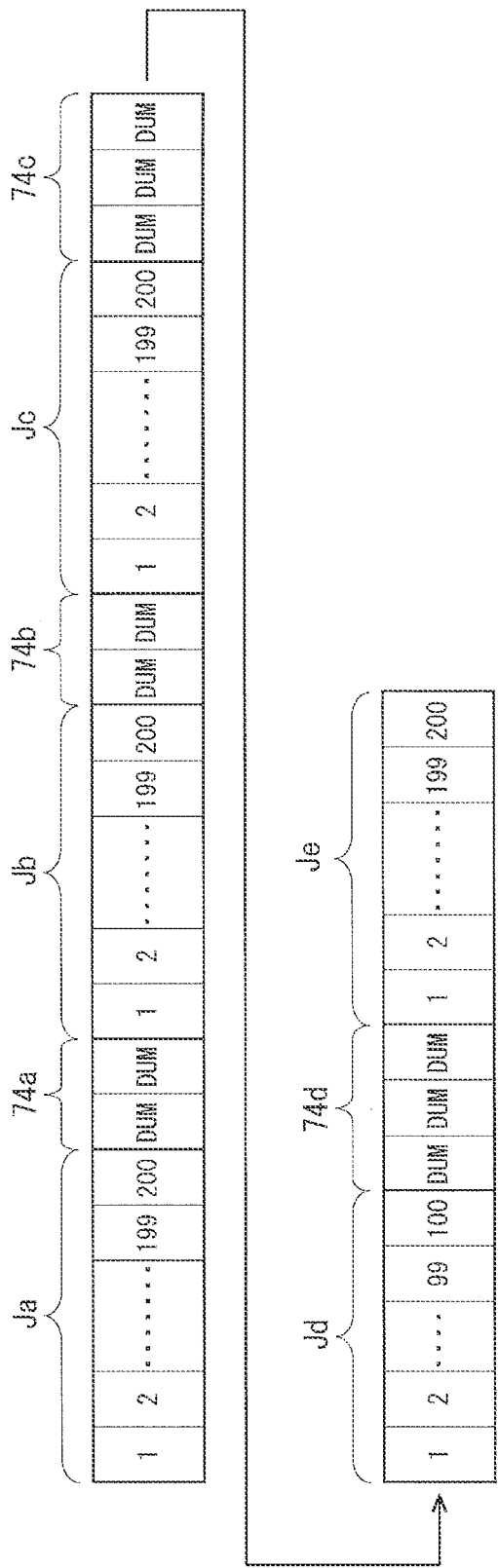
FIG. 10 is a diagram schematically illustrating a result of printing based on the print data in which the dummy data is inserted according to the first embodiment.

A result of printing based on the print data in which the dummy data is inserted as described above is as illustrated in FIG. 10. In FIG. 10, a rectangular portion described as "DUM" is a dummy page (the same applies to FIG. 14). Dummy pages corresponding to 3.33 m are inserted respectively between the final page of the job Ja and the first page of the job Jb (a portion denoted by reference numeral 74a) and between the final page of the job Jb and the first page of the job Jc (a portion denoted by reference numeral 74b). Further, dummy pages corresponding to 5.00 m are inserted respectively between the final page of the job Jc and the first page of the job Jd (a portion denoted by reference numeral 74c) and between the final page of the job Jd and the first page of the job Je (a portion denoted by reference numeral 74d). Note that no dummy page is inserted after the final page of the job Je as the last job.

Figure 11:
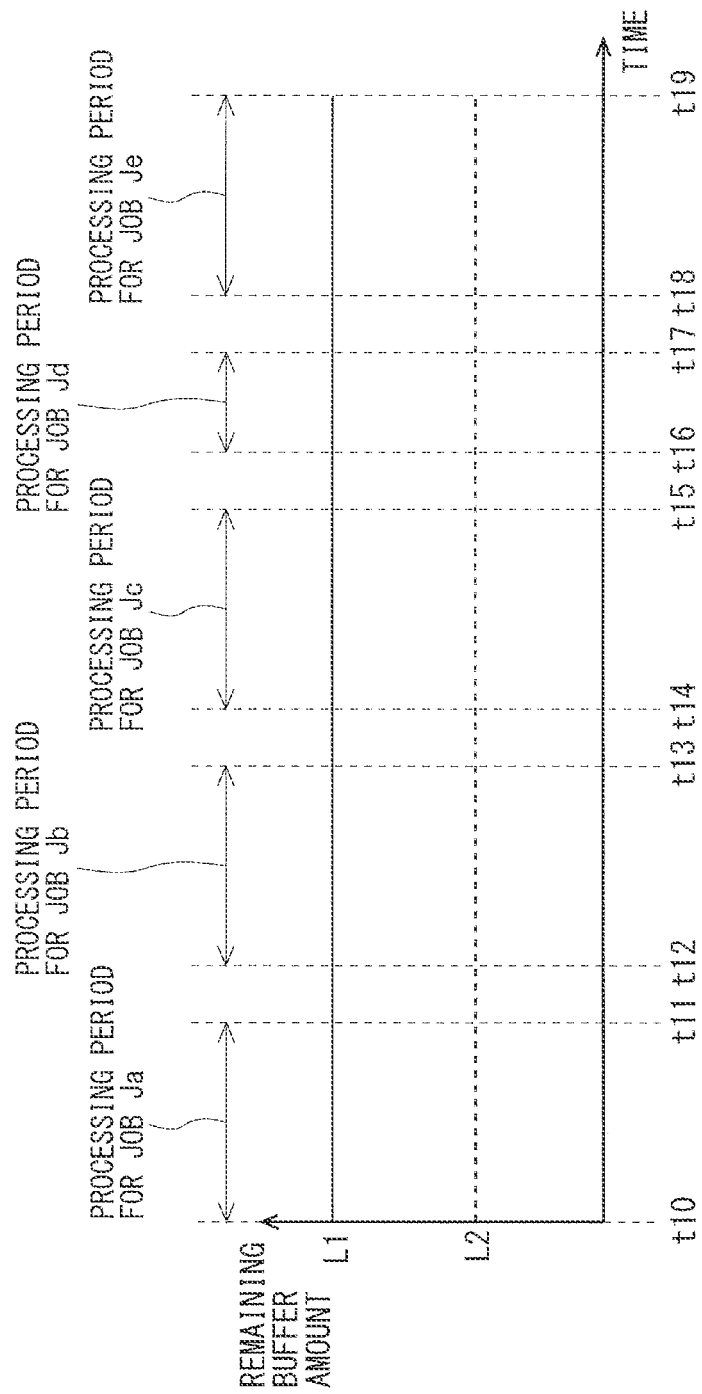
FIG. 11 is a diagram for illustration of a change in the remaining buffer amount according to the first embodiment.

Here, a change in the remaining buffer amount in the above example will be described with reference to FIG. 11. When the remaining buffer amount decreases to L2, an instruction to request deceleration is sent from the web buffer 50 to the printing device 10. At time t10, the remaining buffer amount is L1 (full state). During a period from time t10 to time t11, the gathering machine 63 performs processing for the job Ja. During this period, since the processing for the job Ja is performed without waiting time occurring in the gathering machine 63, the remaining buffer amount is maintained at L1. A period from time t11 to time t12 is a period in which the waiting time occurs in the gathering machine 63. In this period, although the waiting time occurs in the gathering machine 63, a dummy page corresponding to the length of the waiting time is inserted as described above, and the dummy page is removed by the dummy page removing unit 610, and therefore the remaining buffer amount is maintained at L1. Similarly, the remaining buffer amount is maintained at L1 in the period after time t12. As above, in the present embodiment, since the dummy page is printed every time the final page of each of jobs other than the job for which printing is executed last is printed, and the dummy pages are removed by the dummy page removing unit 610, the remaining buffer amount is maintained in a full state. Therefore, even if the waiting time occurs in the gathering machine 63, it is not necessary to lower the printing speed.

Note that, in consideration or the capacity of the web buffer 50, the dummy data may be inserted into the print data PD so that a dummy page is printed every time printing based on a plurality of jobs excluding a job to be printed last is performed. In this case, a dummy page having a print length corresponding to a total time of the waiting time occurring a plurality of times is printed.

<1.6 Effects>

According to the present embodiment, the control unit 140 that controls the operation of the printer main body 200 is provided with the dummy data insertion unit 141 that inserts the dummy data into the print data PD based on the waiting time occurring in the gathering machine 63. When the dummy data is inserted into the print data PD, printing of the dummy page is performed by the printing units 24a and 24b. In addition, the sheet cutter 61 disposed between the printing device 10 and the gathering machine 63 is provided with the dummy page removing unit 610 that removes a dummy page from printed printing paper. With the above configuration, when the waiting time occurs in the gathering machine 63, a dummy page that is unnecessary by nature is printed depending on the length of the waiting time. Therefore, even if the waiting time occurs in the gathering machine 63, it is not necessary to reduce the printing speed. That the printing device 10 may not support acceleration/deceleration printing. Furthermore, deterioration in print quality is suppressed. Since the dummy page included in the printed printing paper is removed without being supplied to the gathering machine 63, the difference in processing speed between the printing device 10 and the post-process machine group 60 is absorbed. Since the difference in processing speed between the printing device 10 and the post-process machine group 60 is absorbed in this manner, it is not necessary to rearrange an execution order of the jobs in consideration of the waiting time occurring in the gathering machine 63.

As above, according to the present embodiment, it is possible to realize the printing system 1 capable of suppressing deterioration in print quality due to the occurrence of the waiting time in the gathering machine 63 even if the printing device 10 does not support acceleration/deceleration printing.

2. Second Embodiment

<2.1 Overview>

An overall configuration of the printing system 1, a configuration of the printing device 10, a hardware configuration of the print control device 100, and a functional configuration of the print control device 100 are similar to those of the first embodiment, and thus, description thereof is omitted (see FIGS. 1 to 4).

In the first embodiment, when the continuous printing based on the plurality of jobs is executed, the dummy data is inserted into the print data PD so that the dummy page is printed every time the final page of each of jobs other than the job for which printing is executed last is printed. On the other hand, in the present embodiment, when printing based on each job is started, the remaining buffer amount at the end point of the post-processing for each job is predicted, and if the remaining buffer amount as the prediction result is not equal to the full amount or not more than the predetermined amount in the vicinity of the full amount (in other words, if the predicted consumption amount of the web buffer 50 is not equal to 0 or not less than a threshold value in the vicinity of 0), the dummy data is inserted into the print data PD.

<2.2 Insertion of Dummy Data>

The procedure of the dummy data insertion processing in the present embodiment will be described with reference to the flowchart illustrated in FIG. 12. The processing in step S200, step S210, and step S220 is the same as the processing in step S100, step S110, and step S120 in FIG. 7.

In step S230, the remaining buffer amount at the end point of the post-processing for the processing target job is predicted (in other words, the buffer consumption amount is predicted). The prediction of the remaining buffer amount will be described in detail later.

Next, it is determined whether or not the remaining buffer amount as the prediction result in step S230 is full (in other words, it is determined whether or not the predicted consumption amount of the web buffer 50 is 0) (step S240). As a result of the determination, when the remaining buffer amount is full, the processing returns to step S200, and the processing related to the next processing target job is performed. That is, when the remaining buffer amount is full, the dummy data corresponding to the processing target job is not inserted. On the other hand, when the remaining buffer amount is not full, the process proceeds to step S250.

Figure 7:
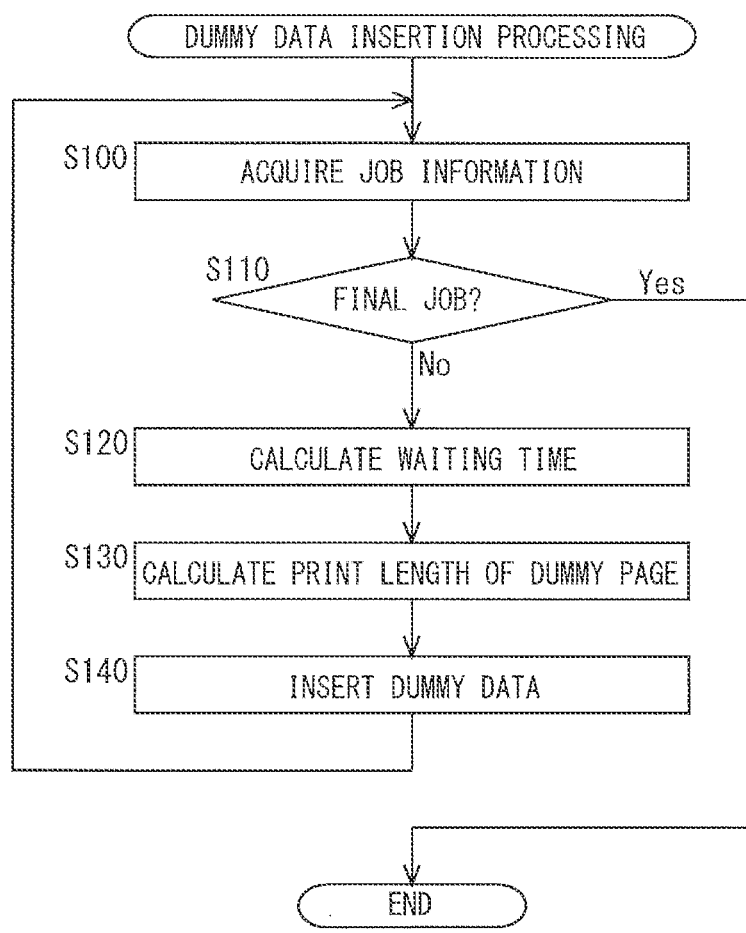
FIG. 7 is a flowchart showing a procedure of dummy data insertion processing according to the first embodiment.
Figure 8:
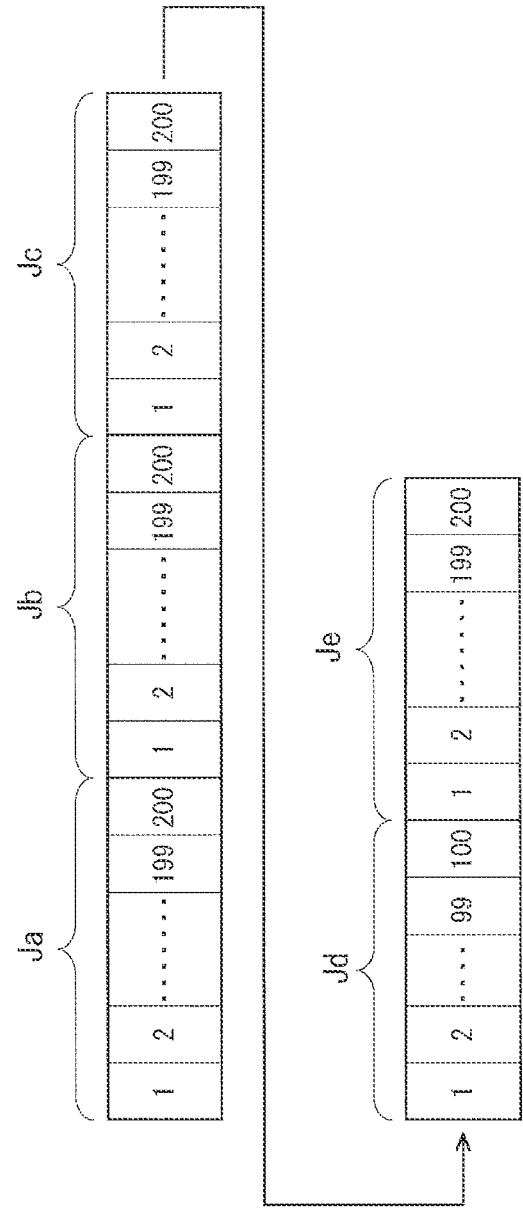
FIG. 8 is a diagram schematically showing an example of print data according to the first embodiment.

In step S250, the print length of the dummy page (inserted page length) is calculated similarly to step S130 of FIG. 7, and in step S260, the dummy data is inserted into the print data PD similarly to step S140 of FIG. 7. Thereafter, the processing returns to step S200, and processing related to the next processing target job is performed.

According to the above procedure, the dummy data is inserted into the print data PD in a case where it is predicted that the remaining buffer amount is not recovered to the full state after the remaining buffer amount decreases depending on the waiting time. However, the configuration may be such that the dummy data is inserted into the print data PD in a case where it is predicted that the remaining buffer amount decreases to such an extent that the printing speed needs to be reduced (that is, in a case where it is predicted that the remaining buffer amount is equal to or less than the predetermined threshold value).

Here, the method of obtaining the remaining buffer amount and the insertion of the dummy page based on the prediction result of the remaining buffer amount will be described while focusing on the case where printing based on the print data PD as illustrated in FIG. 8 is performed. FIG. 13 illustrates a state of the web buffer 50 and the like when post-processing (processing of making a book block in the gathering machine 63) for each job is performed. In this case, the page length is 0.61 m for any page of any job. In addition, it is assumed that the printing speed (the conveyance speed of the printing paper in the printing device 10) is 100 mpm and the post-processing speed (the speed at which the printed printing paper is conveyed to the gathering machine 63 inside the post-process machine group 60) is 103 mpm.

Since the job Ja is a job to be printed first, the remaining buffer amount is maintained in a full state when post-processing for the job Ja is performed. When the post-processing target is switched from the job Ja to the job Jb, the waiting time of two seconds occurs. A decrease amount of the remaining buffer amount associated with this is obtained by the same equation as the above equation (1). Since the printing speed is 100 mpm (1.667 m per second) and the waiting time is 2 seconds, the decrease amount of the remaining buffer amount is 3.33 m. Therefore, at a start point of the post-processing for the job Jb, the buffer consumption amount is 3.33 m.

In a period during which post-processing for the job Jb is being performed, the post-processing speed (103 mpm) is higher than the printing speed (100 mpm), and thus the remaining buffer amount gradually recovers. When the printing speed is represented by V1, the post-processing speed is represented by V2, and the page length is represented by L, a recovery amount Br of the remaining buffer amount in the period in which the processing for each page is performed is obtained by the following equation (2).

$$Br = (V2 - V1) \times (L/V1) \quad (2)$$

From the above equation (2), the recovery amount Br of the remaining buffer amount in the period in which the processing for each page is performed is about 0.02 m.

The buffer consumption amount at the end point of the processing for each page is obtained by subtracting the recovery amount of the remaining buffer amount in the period in which the processing for each page is performed from the buffer consumption amount at the end point of the processing for the previous page.

Figure 12:
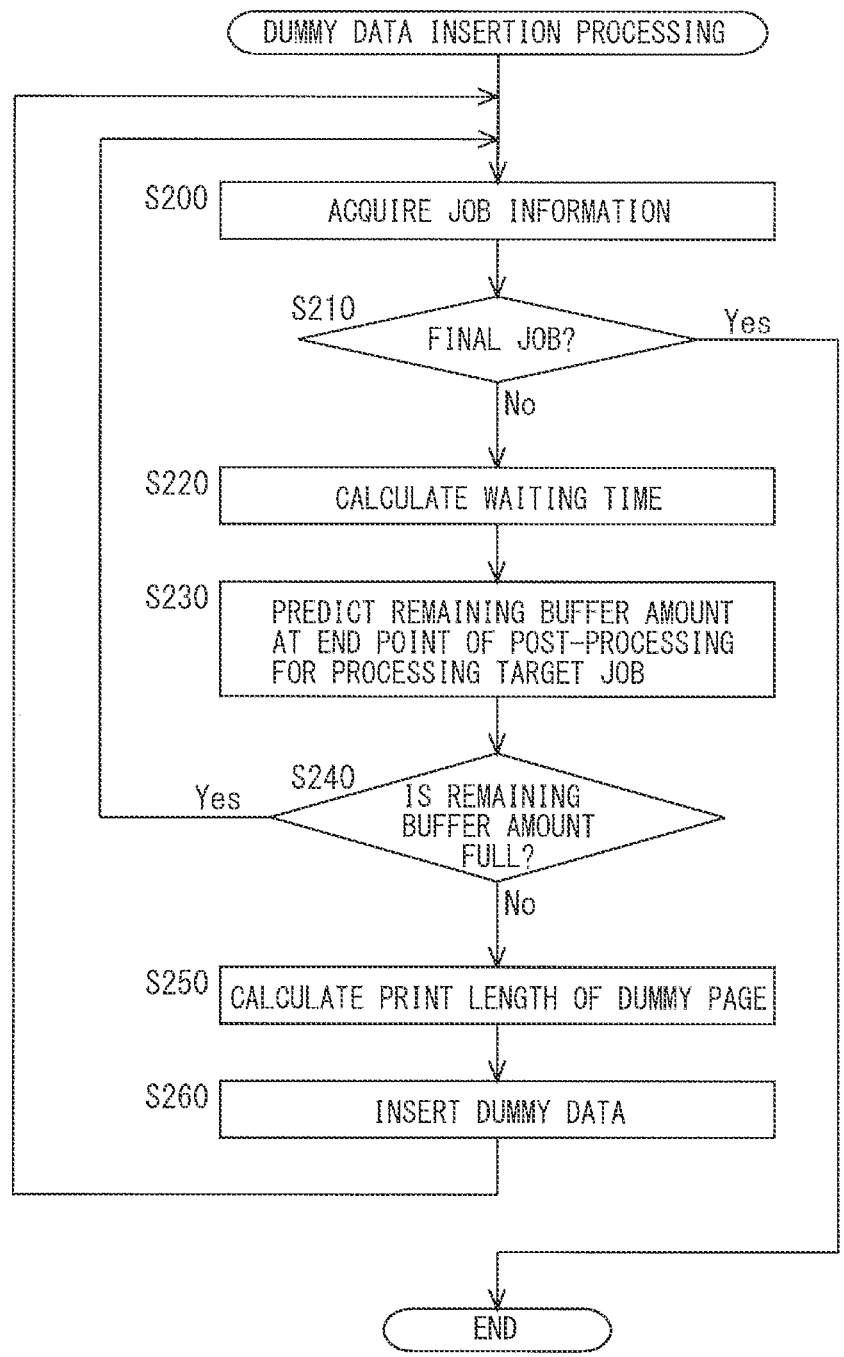
FIG. 12 is a flowchart showing a procedure of the dummy data insertion processing according to a second embodiment of the present invention.

From the above, the buffer consumption amount at the end point of the post-processing for the job Jb (the end point of the processing for the final page of the job Jb) can be predicted in advance (step S230 in FIG. 12). Since the buffer consumption amount at the end point of the post-processing for the job Jb is 0 as indicated by a portion denoted by reference numeral 81 in FIG. 13, a dummy page is not inserted between the final page of the job Ja and the first page of the job Jb as indicated by a portion denoted by reference numeral 82 in FIG. 13. Similarly, since the buffer consumption amount at the end point of the post-processing for the job Jc is 0 as indicated by a portion denoted by reference numeral 63 in FIG. 13, a dummy page is not inserted between the final page of the job Jb and the first page of the job Jo as indicated by a portion denoted by reference numeral 84 in FIG. 13.

However, since the number of pages of the jobs Jb and Jc is 200 while the number of pages of the job Jd is 100, the buffer consumption amount at the end point of the post-processing for the job Jd is 1.50 as indicated by a portion denoted by reference numeral 85 in FIG. 13. Therefore, a dummy page having a length (3.33 m) obtained by the above equation (1) is inserted between the final page of the job Jc and the first page of the job Jd (see a portion denoted by reference numeral 86 in FIG. 13). Note that, in such a case, a dummy page having a length equal to the buffer consumption amount at the end point of the post-processing for each job (1.50 m in the above example) may be inserted.

Figure 14:
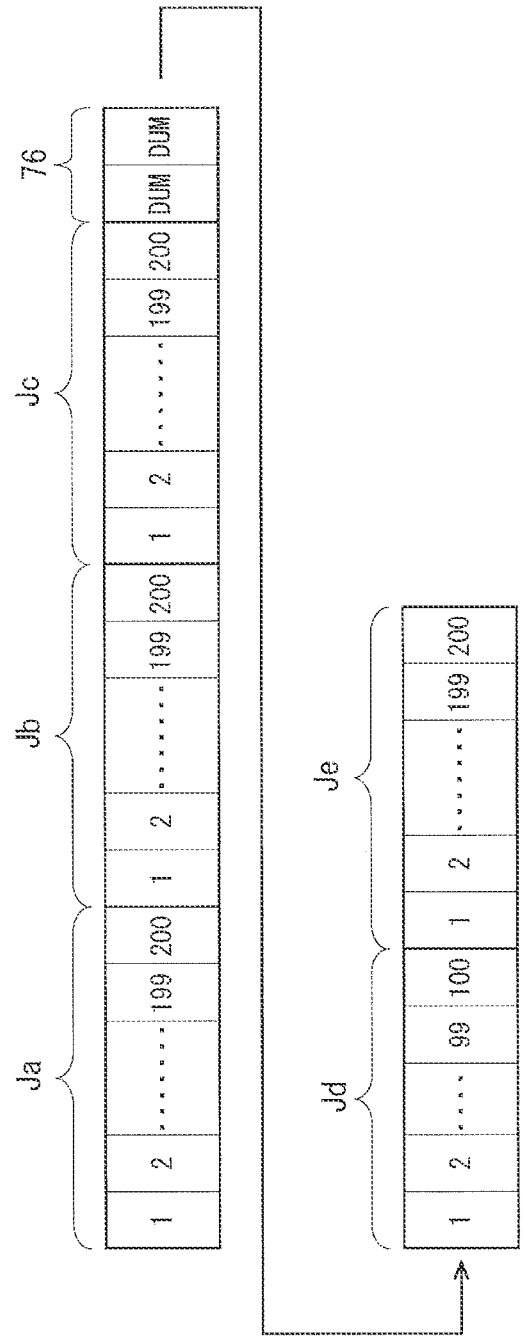
FIG. 14 is a diagram schematically illustrating a result of printing based on the print data in which the dummy data is inserted according to the second embodiment.

A result of printing based on the print data in which the dummy data is inserted by the above-described processing is as illustrated in FIG. 14. A dummy page for 3.33 m is inserted only between the final page of the job Jc and the first page of the job Jd (a portion denoted by reference numeral 76).

Figure 15:
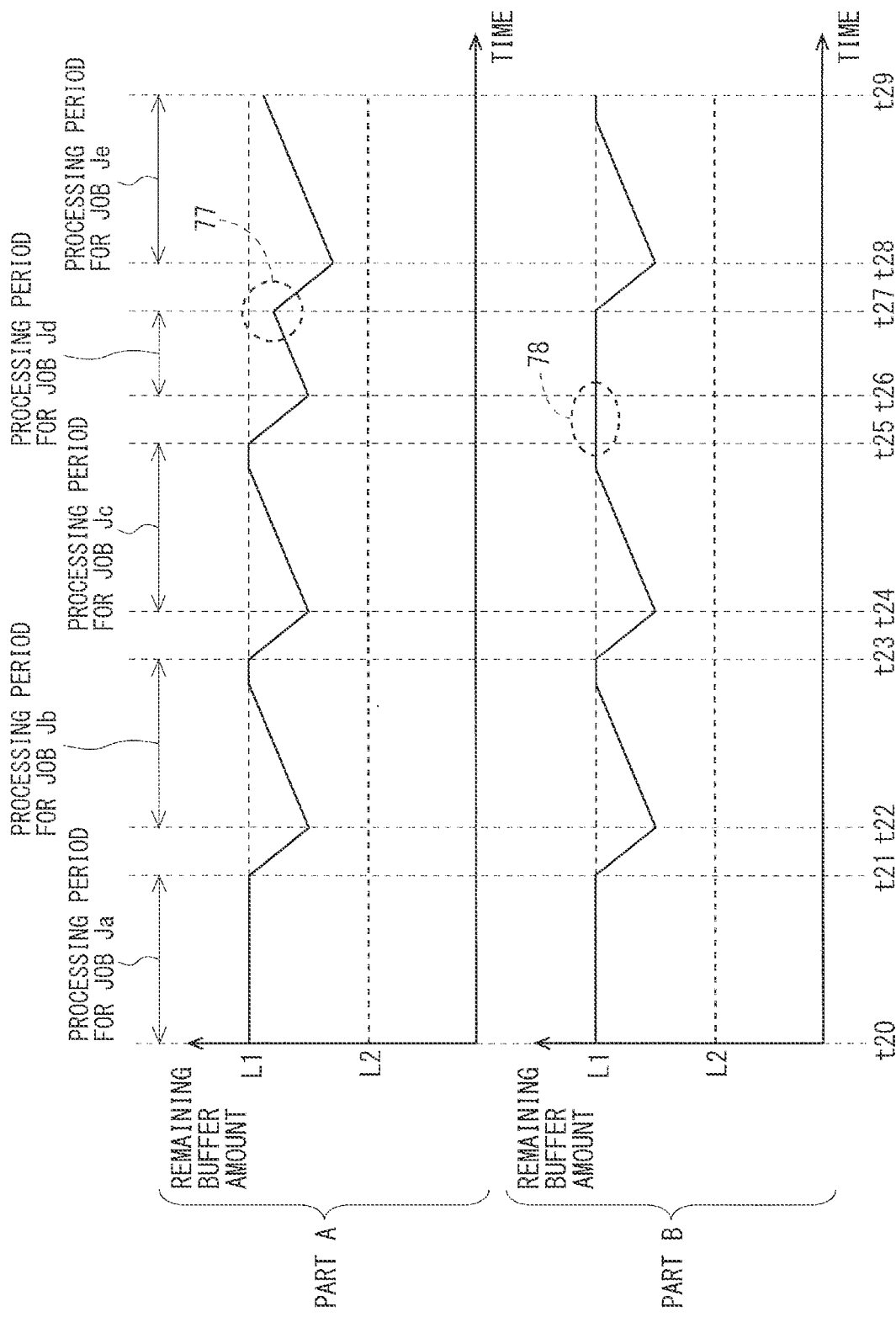
FIG. 15 is a diagram for illustration of a change in the remaining buffer amount according to the second embodiment.

A change in the remaining buffer amount will be described with reference to FIG. 15. Regarding FIG. 15, a change in the remaining buffer amount in a case where no dummy page is inserted is illustrated in Part A, and a change in the remaining buffer amount according to the present embodiment is illustrated in Part B.

First, focus is paid to Part A. At the time of switching jobs, the remaining buffer amount decreases in response to the occurrence of the waiting time. At an end point of the processing period for the job Jb (time t23) and an end point of the processing period for the job Jc (time t25), the remaining buffer amount has recovered to the full state. However, since the number of pages of the job Jd is smaller than the number of pages of the job Jb and the job Jc, the remaining buffer amount is not recovered to the full state at the end point of the processing period for the job Jd (time t27) (see a portion denoted by reference numeral 77 in FIG. 15). For this reason, there is a concern that the remaining buffer amount decreases to such an extent that a reduction in printing speed is required when a large number of lobs with a small number of pages are included in the jobs to be printed. As described above, a reduction in printing speed causes a reduction in print quality.

Next, focus is paid to Part B. At the time of switching from the job Ja to the job Jb and at the time of switching from the job Jb to the job Jc, the remaining buffer amount decreases in response to the occurrence of the waiting time. At an end point of the processing period for the job Jb (time t23) and an end point of the processing period for the job Jc (time t25), the remaining buffer amount has recovered to the full state. At the time of switching from the job Jc to the job Jd, the waiting time occurs, but since the dummy page is inserted between the final page of the job Jc and the first page of the job Jd as described above, the remaining buffer amount is maintained in a full state without being reduced (see a portion denoted by reference numeral 78 in FIG. 15). Thereafter, although the remaining buffer amount decreases in response to the occurrence of the waiting time at the time of switching from the job Jd to the job Je, the remaining buffer amount is recovered to the full state at the end time of the processing period for the job Je (time t29). In this manner, in the present embodiment, although the dummy page is not necessarily inserted every time the job is switched, the remaining buffer amount does not decrease to such an extent that the printing speed needs to be reduced.

<2.3 Effects>

According to the present embodiment, as in the first embodiment, it is possible to realize the printing system 1 capable of suppressing deterioration in print quality due to the occurrence of the waiting time in the gathering machine even if the printing device 10 does not support acceleration/deceleration printing. In addition, according to the present embodiment, the dummy data is inserted into the print data PD only when it is predicted that the remaining buffer amount will not be recovered to the full state after the waiting time occurs in the gathering machine 63. For this reason, the occurrence of waste sheets is suppressed as compared with the first embodiment.

3. Modifications

Hereinafter, modifications will be described.

<3.1 First Modification>

Figure 16:
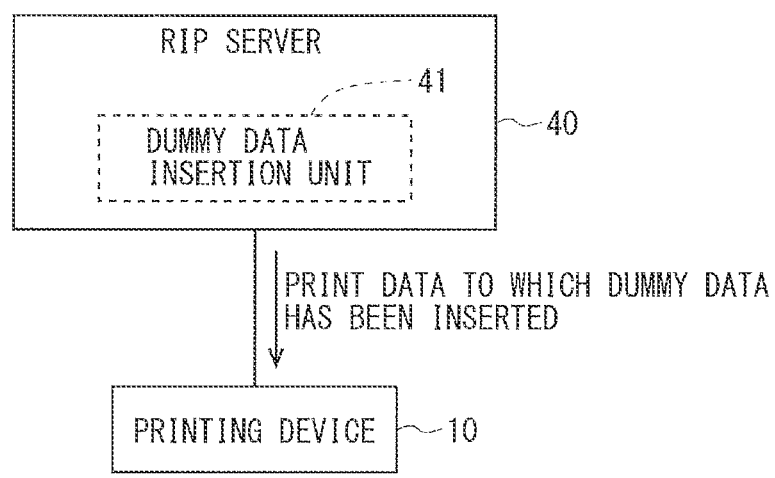
FIG. 16 is a block diagram for illustration of a configuration of a first modification.

In each of the above embodiments, the dummy data insertion unit 141 is provided for the control unit 140 that controls the operations of the components included in the printer main body 200. However, the present invention is not limited thereto, and as illustrated in FIG. 16, the clammy data insertion unit 41 may be provided for the RIP server 40 as a rasterization processing device. In this case, when the RIP processing is performed on the submitted data in the RIP server 40, the dummy data insertion unit 41 determines whether or not to insert a dummy page into the print data. In a case where the dummy page is inserted into the print data, the dummy data insertion unit 41 can calculate the waiting time and the print length of the dummy page by a procedure similar to that of the first embodiment and the second embodiment. In the present modification, the print data into which the dummy page is inserted is sent from the RIP server 40 to the printing device 10. Therefore, the printing device 10 does not need to perform the dummy data insertion processing described above.

<3. Second Modification>

Figure 17:
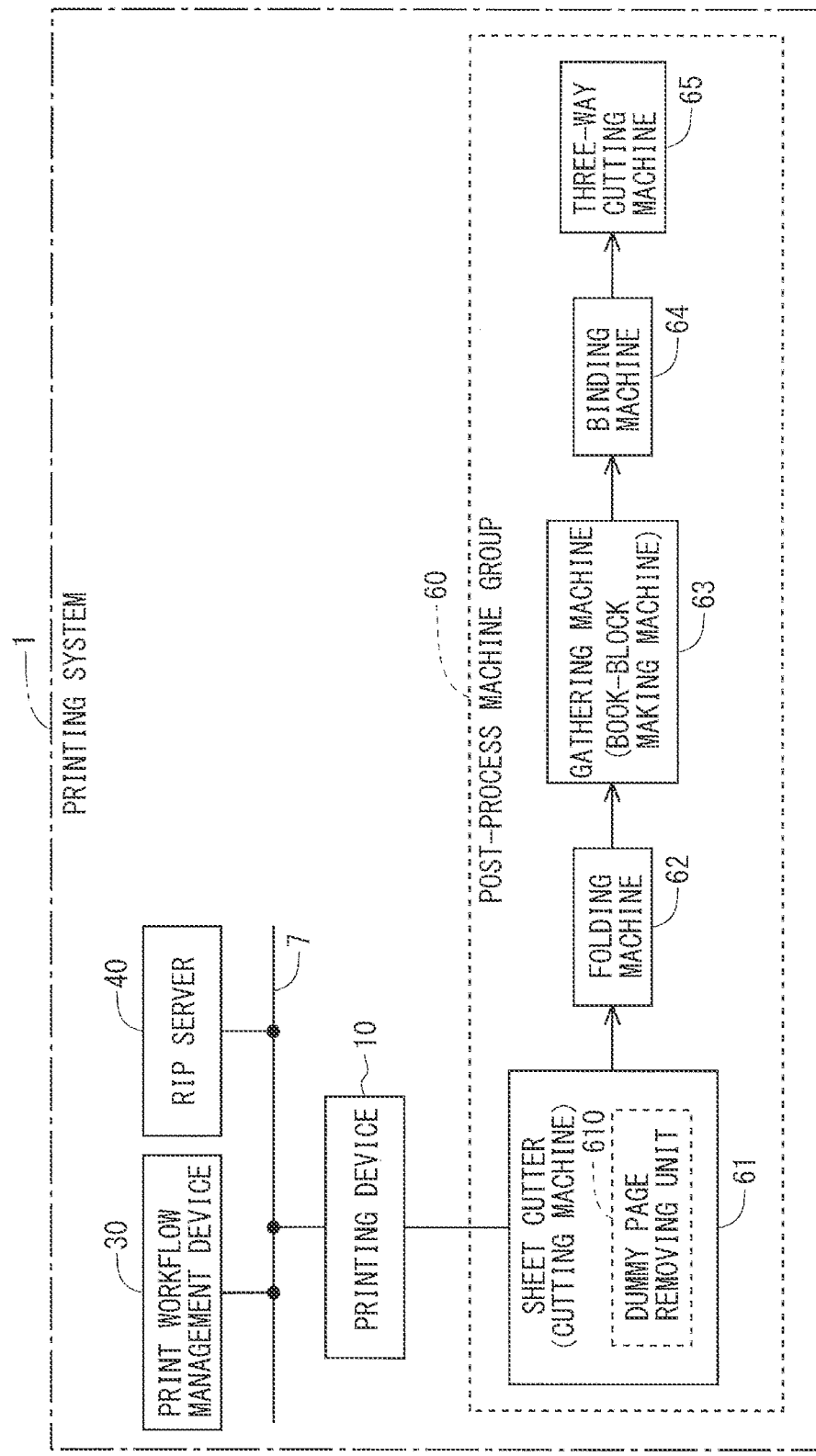
FIG. 17 is a block diagram showing an overall configuration of the printing system according to a second modification.

In the first embodiment, when the continuous printing based on the plurality of jobs is executed, the dummy page is printed every time the final page of each of jobs except for the job to be printed last is printed. Therefore, during execution of continuous printing, the remaining buffer amount was maintained in a full state as illustrated in FIG. 11. In view of this, even if the web buffer 50 is not provided, it is not necessary to reduce the printing speed when the waiting time occurs in the post-processing device (such as the gathering machine 63). Therefore, as illustrated in FIG. 17, it is also possible to adopt a configuration in which the web buffer 50 is not provided between the printing device 10 and the post-process machine group 60. According to such a configuration, the cost is reduced as compared with the conventional configuration.

<3.3 Third Modification>

Figure 18:
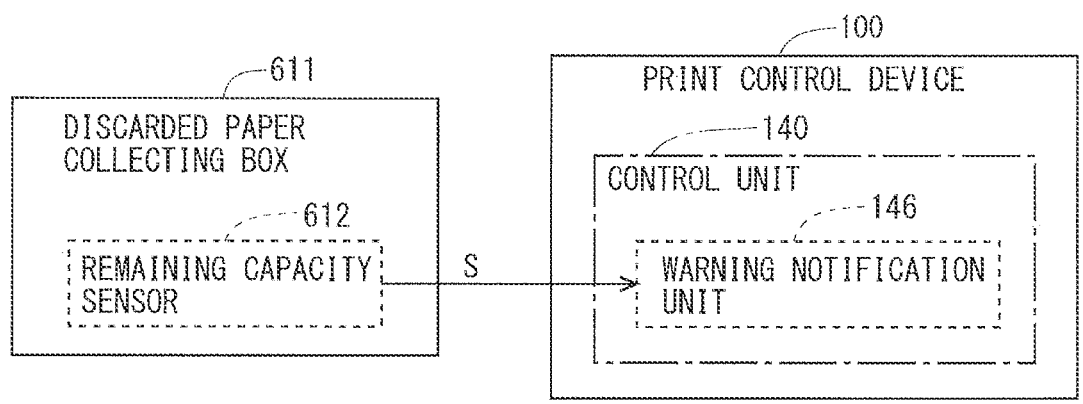
FIG. 18 is a block diagram for illustration of a configuration of a third modification.

In each of the above embodiments, the dummy page printed by the printing units 24a and 24b is removed by the dummy page removing unit 610 provided for the sheet cutter 61. In this regard, the configuration may be such that a box for collecting the dummy page removed by the dummy page removing unit 610 (hereinafter referred to as a "discarded paper collecting box") is provided and a function of notifying of warning message when it is predicted that printing paper (discarded paper) overflows from the discarded paper collecting box is provided. A configuration for realizing this will be described below with reference to FIG. 18.

Figure 19:
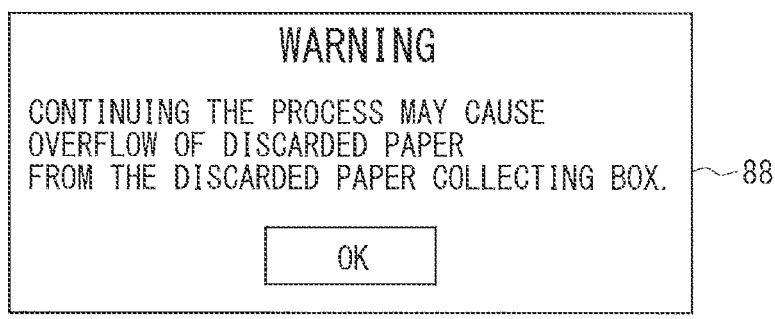
FIG. 19 is a diagram showing an example of a warning screen displayed on a display unit of the print control device in the third modification.
Figure 20:
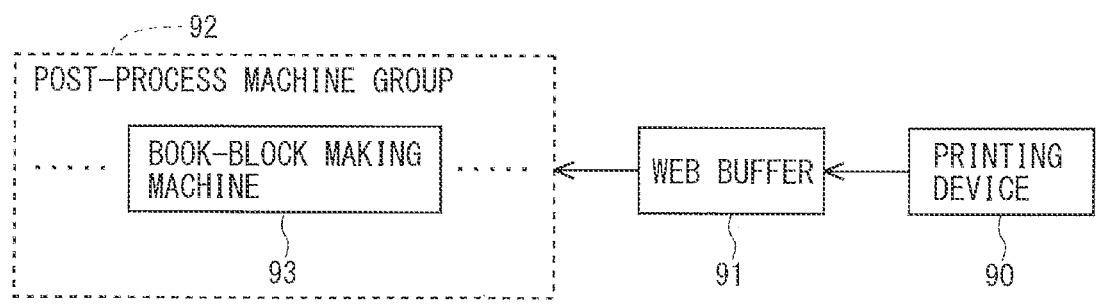
FIG. 20 is a diagram for illustration of provision of a web buffer for temporarily holding printed printing paper according to the conventional example.

In the present modified example, a discarded paper collecting box 611 that accumulates dummy pages (discarded papers) removed by the dummy page removing unit 610 among the printed printing paper is provided in the vicinity of the sheet cutter 61. The discarded paper collecting box 611 has a predetermined capacity. In addition, a remaining capacity sensor 612 that detects the remaining capacity of the discarded paper collecting box 611 is provided inside or outside the discarded paper collecting box 611. Furthermore, the control unit 140 of the print control device 100 is provided with a warning notification unit 146 that notifies of a predetermined warning message in a case where it is predicted that the remaining capacity of the discarded paper collecting box 611 becomes equal to or less than a predetermined threshold value by inserting dummy data into the print data PD. In such a configuration, a detection signal S indicating the remaining capacity detected by the remaining capacity sensor 612 is sent from the remaining capacity sensor 612 to the warning notification unit 146. The warning notification unit 146 predicts whether or not the remaining capacity of the discarded paper collecting box 611 becomes equal to or less than the predetermined threshold value on the basis of the detection signal S. Then, in a case where it is predicted that the remaining capacity of the discarded paper collecting box 611 becomes equal to or less than the predetermined threshold value, the warning notification unit 146 displays a warning screen 88 as illustrated in FIG. 19, for example, on the display unit 123 (FIG. 3) of the print control device 100. Note that, in the present modification, a discarded dummy page accumulation unit is realized by the discarded paper collecting box 611.

According to the present modification, it is possible to prevent the surroundings of the dummy page removing unit 610 from being scattered by the dummy page after being discarded (discard paper).

4. Others

The present invention is not limited to the above-described embodiment (as well as modifications), and various modifications can be made without departing from the spirit of the present invention. For example, although the processing of inserting the dummy data is performed so that the remaining buffer amount does not decrease to such an extent that the printing speed needs to be decelerated in the embodiment described above, the present invention can also be applied to a case in which an operation of "deceleration of the printing speed is allowed but stopping of printing is not allowed" is adopted.

Furthermore, in the above embodiment, the two-dimensional code (two-dimensional barcode) is printed on the dummy page as a symbol for dummy page identification. However, the symbol for dummy page identification is not limited to the two-dimensional code. For example, marks identifiable in size or density (for example, rectangular marks having different lengths in the paper conveyance direction or the paper width direction) may be printed on each of normal print pages and dummy pages. In this case, the dummy page removing unit may identify the normal print pages and the dummy pages using an image recognizable scanner (image reading unit) instead of the two-dimensional code reader.

This application is as application claiming priority based on Japanese Patent Application No. 2021-118429 entitled "PRINTING SYSTEM AND PRINTING METHOD" filed on Jul. 19, 2021, and the contents of which are herein incorporated by reference.

What is claimed is:
1. A printing system including:
a printing device having a conveyance unit that conveys a print medium and a printing unit that performs printing, based on print data, on the print medium conveyed by the conveyance unit; and
a post-processing device that performs post-processing to a printed print medium to which the printing is performed by the printing unit,
wherein the post-processing device is directly connected to the printing device, and
wherein the printing system further comprises:
a waiting time calculating unit configured to calculate a waiting time based on at least a speed difference between a printing speed of the printing device and a post-processing speed of the post-processing device;
a dummy data insertion unit configured to insert dummy data into the print data so that a dummy page is printed by the printing unit, the dummy page having a print length corresponding to a length of the waiting time calculated by the waiting time calculating unit; and
a dummy page removing unit configured to remove the dummy page from the printed print medium so that the dummy page is not supplied to the post-processing device, the dummy page removing unit being disposed between the printing device and the post-processing device.

2. The printing system according to claim 1, further comprising a print medium buffer configured to temporarily hold the printed print medium when the waiting time occurs in the post-processing device, the print medium buffer being provided between the printing device and the dummy page removing unit.

3. The printing system according to claim 2, wherein the dummy data insertion unit determines whether or not the dummy data is to be inserted into the print data in consideration of a consumption amount of the print medium buffer.

4. The printing system according to claim 3, wherein the dummy data insertion unit predicts, when printing based on each job by the printing unit is started, a consumption amount of the print medium buffer at an end of post-processing based on the each job, and inserts the dummy data into the print data unless the predicted consumption amount is equal to 0 or smaller than a threshold value in the vicinity of 0.

5. The printing system according to claim 2, wherein when the printing unit executes continuous printing based on a plurality of jobs, the dummy data insertion unit inserts the dummy data into the print data so that the dummy page is printed every time printing based on jobs except a job for which printing is executed last is performed.

6. The printing system according to claim 1, wherein when the printing unit executes continuous printing based on a plurality of jobs, the dummy data insertion unit inserts the dummy data into the print data so that the dummy page is printed immediately after a final page of each of jobs except a job for which printing is executed last is printed.

7. The printing system according to claim 1, wherein a length of the dummy page corresponding to the dummy data inserted into the print data by the dummy data insertion unit depending on one waiting time occurring in the post-processing device is equal to or longer than a length corresponding to a product of a speed at which the print medium is conveyed by the conveyance unit and the waiting time occurring in the post-processing device.

8. The printing system according to claim 1, wherein
the dummy page removing unit includes an image reading unit,
an identifiable mark is printed on the dummy page by the printing unit, and
the dummy page removing unit determines whether or not each of pages of the printed print medium is the dummy page based on a result of reading of each of the pages of the printed print medium by the image reading unit.

9. The printing system according to claim 1, further comprising:
- a discarded dummy page accumulation unit configured to accumulate a dummy page removed by the dummy page removing unit from the printed print medium, the discarded dummy page accumulation unit having a predetermined capacity;
- a remaining capacity sensor configured to detect a remaining capacity of the discarded dummy page accumulation unit; and
- a warning notification unit configured to notify a predetermined warning message, when it is predicted that the insertion of the dummy data into the print data makes the remaining capacity of the discarded dummy page accumulation unit equal to or less than a predetermined threshold value, on the basis of a result of detection of the remaining capacity of the discarded dummy page accumulation unit by the remaining capacity sensor.

10. The printing system according to claim 1, wherein the dummy data insertion unit obtains waiting time occurring in the post-processing device on a basis of job information that is information regarding a job for which the printing by the printing unit is to be performed.

11. The printing system according to claim 1, wherein a predetermined pattern used for maintenance of the printing unit is printed on the dummy page by the printing unit.

12. The printing system according to claim 1, wherein
the printing device includes a control unit configured to control operations of the printing unit and the conveyance unit, the control unit includes the dummy data insertion unit, and the dummy data insertion unit determines, when the control of operations of the printing unit by the control unit is started based on data of each of jobs constituting the print data, whether or not to insert the dummy data into the print data.

13. The printing system according to claim 1, further comprising a rasterization processing device configured to generate the print data by performing a rasterization process on submitted data, wherein
the rasterization processing device includes the dummy data insertion unit, and
the dummy data insertion unit determines, when the rasterization processing device performs the rasterization process, whether or not to insert the dummy page into the print data.

14. The printing system according to claim 1, further comprising a cutting machine configured to cut the printed print medium, wherein
the cutting machine includes the dummy page removing unit, wherein
a book-block making machine is provided as the post-processing device, the book-block making machine being configured to make a book block by collecting print media after cutting by the cutting machine for each one set, and
the waiting time occurs during a period from a start point of processing for one set to a start point of processing for next one set in the book-block making machine.

15. A printing method in a printing system including: a printing device having a conveyance unit that conveys a print medium and a printing unit that performs printing, based on print data, on the print medium conveyed by the conveyance unit; and a post-processing device that performs post-processing to a printed print medium to which the printing is performed by the printing unit, the post-processing device being directly connected to the printing device, the printing method comprising:
- a waiting time calculating step of calculating a waiting time based on at least a speed difference between printing speed in the printing device and post-processing speed in the post-processing device;
- a dummy data insertion step of inserting dummy data into the print data so that a dummy page is printed by the printing unit, the dummy page having a print length corresponding to a length of the waiting time calculated in the waiting time calculating step; and
- a dummy page removing step of removing the dummy page from the printed print medium so that the dummy page is not supplied to the post-processing device.

* * * * *